Aug. 30, 1932.  O. K. MARTI  1,873,973

SOLID ELECTRODE SEAL FOR RECTIFIERS

Filed April 24, 1930

Inventor
Othmar K. Marti
By
Attorney

Patented Aug. 30, 1932

1,873,973

UNITED STATES PATENT OFFICE

OTHMAR K. MARTI, OF HADDONFIELD, NEW JERSEY, ASSIGNOR, BY MESNE ASSIGNMENTS, TO ALLIS-CHALMERS MANUFACTURING COMPANY, OF MILWAUKEE, WISCONSIN, A CORPORATION OF DELAWARE

SOLID ELECTRODE SEAL FOR RECTIFIERS

Application filed April 24, 1930. Serial No. 446,843.

This invention relates to improvements in sealing devices for use with evacuated structures and, particularly, to means for sealing the joints between the structural portions of highly evacuated devices such as electric current rectifiers.

Apparatus to be maintained in a highly evacuated condition must be sealed, at the joints of the several structural portions thereof, in a gas-tight relation. The production and maintenance of such seal was, heretofore, one of the major difficulties in the manufacture and maintenance of electric current rectifiers of the metallic vapor type which are encased in metal, for the reason that such rectifiers require a vacuum of the order of .002-.005 mm of mercury. Heretofore, such rectifiers were provided with various types of seals, the most successful of which are seals of mercury which, however, required constant supervision to secure the proper sealing action. Such seals, although satisfactory in performing their functions, are of intricate and expensive construction. The chief advantage of such seals is the fact that mere inspection will show whether or not the joints to which the seals are applied are gas-tight or are leaking. Rectifiers have been proposed for purposes, such as transportation units, in which a solid seal would be more advantageous for many reasons apparent to those skilled in the art.

It is, therefore, among the objects of the present invention to provide a solid seal for the joints of highly evacuated apparatus such as electric current rectifiers and, particularly, a seal for use with the anodes of such rectifiers.

Another object of the present invention is to provide a solid seal for highly evacuated apparatus, which seal may be tested, whether the apparatus is in use or not, and in which leakages may be temporarily stopped by use of a sealing fluid.

Another object of the invention is to provide a solid seal for rectifiers which seal may be disassembled without destruction of the seal and replacement of a leaky seal is thus facilitated.

Figure 1:
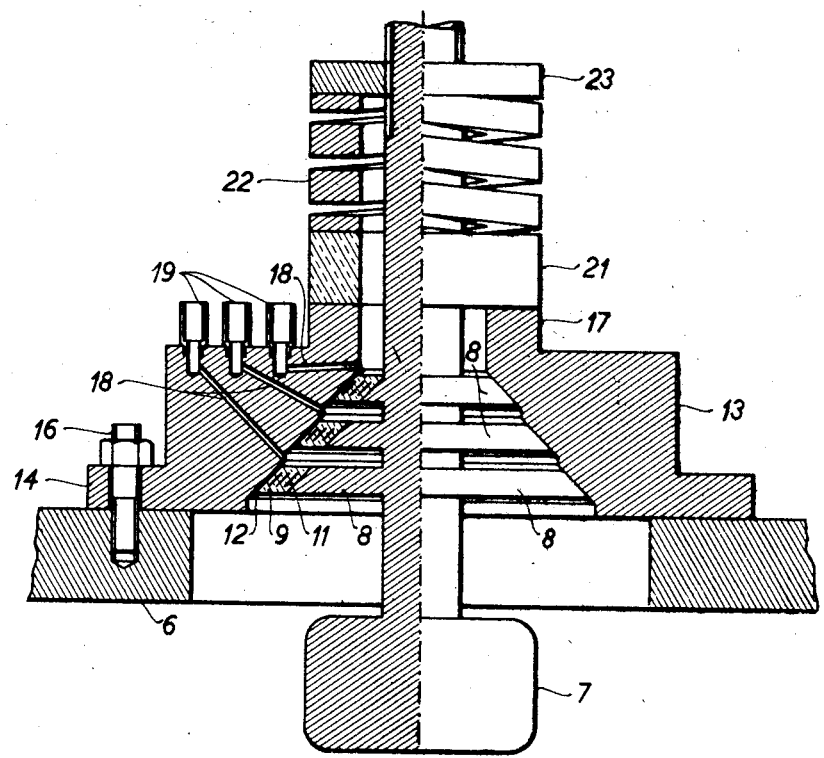
Figure 2:
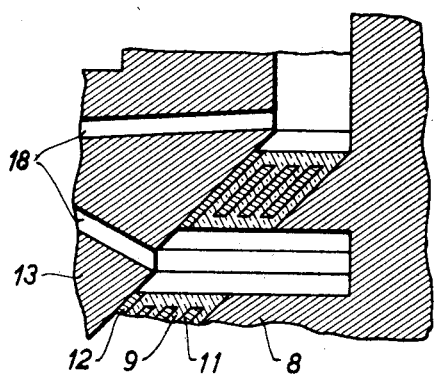
Figure 3:
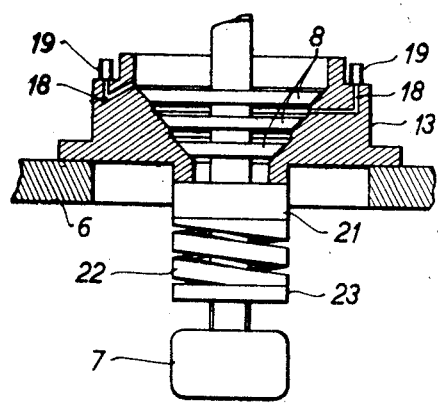

Objects and advantages, other than those above set forth, will be apparent from the following description when read in connection with the drawing in which Figure 1 is a cross-sectional view showing a seal of the improved construction applied to an anode of an electric power rectifier;

Fig. 2 is an enlarged fragmentary portion of the view shown in Fig. 1 to show the detailed construction and arrangement of the improved seal construction, and Fig. 3 is a modification of the structure shown in Fig. 1 arranged in what may be called a reversed manner.

Referring more particularly to the drawing by characters of reference, the reference numeral 6 indicates a portion of a highly evacuated electric power rectifier tank having an aperture therethrough for the insertion of an anode or other element 7. A plurality of spaced parallel disks 8 are formed integrally with the anode proper and extend laterally therefrom and are progressively smaller for reasons which will appear hereinafter. The spaces between the several disks 8 and the inner surface of cap 13 are filled with a suitable insulating material 9 such as a vitreous enamel, preferably having substantially the same co-efficient of expansion as that of the metallic anode, for the purpose of insulating the anode from the tank 6. For some enamels or vitreous materials, when used as the insulation 9, it is desirable and even necessary to reinforce the insulation by the use of reinforcement in the shape of rings 11, preferably imbedded within the insulation. A metallic ring 12 of substantially conical shape is fastened on the insulation 9 and is carefully turned and polished on its outer surface.

A cap 13 having a substantially conical inner surface is formed with a flange 14 through which studs 16 extend into or from the tank 6 for the purpose of securing the cap to the tank; and is formed with a flange 17 extending upwardly from the main portion of the cap in spaced relation from the anode. The cap is provided with numerous passageways 18 extending from the upper surface thereof into communication with spaces formed between the inner surface of the cap and the edges of the disks. The rings 12 are ground into sealing engagement with correspondingly shaped surfaces on the interior of the cap 13 forming seats for the rings which seat thereon in gas-tight relation. The outer ends of the passageways are closed by devices 19 similar to gauge glasses by which means a fluid sealing may be supplied to the spaces between the disks 8 to test the sealing tightness of the rings 12 on seats formed therefor on the interior surface of the cap.

A cylindrical member of insulating material 21 is seated on the flange 17 and is held thereon under the action of a spring 22 compressed by a terminal lug nut 23 threaded on the anode. The ring retains the anode insulation rings 12 on the seats formed therefor on the interior of the cap. The several rings 12 and their seats, together with the spaces between the peripheries of the disks and the cap, form a labyrinth joint, the tightness of which may readily be tested by supplying a sealing fluid to the testing devices 19 and determining which of the rings 12 is permitting a flow of sealing fluid into the rectifier or the tightness of the seals may be tested during manufacture and all but the upper passageway may then be sealed by welding or other suitable means. Each anode may be provided with only one or with a plurality of insulation members and rings as may be desired.

Figure 2 illustrates a construction in part, somewhat enlarged, of one of the sealing rings and the adjacent disks. The structure therein illustrated more clearly shows the structure described above with respect to Fig. 1. It will be seen that the seal structure shown and described can be entirely disassembled without damage to the seal or that the cap and the anodes may be removed as a unit without disturbing the relation of the several parts.

The structure illustrated in Fig. 3 is very similar to that illustrated in Fig. 1 with the exception that, as shown, the arrangement thereof is reversed so that the spring is now arranged between the bottom portion of the cap and the anode seat in such manner that the atmospheric pressure adds its effect to the pressure of the spring for the purpose of tightening the seal.

Although but one embodiment of the invention has been illustrated and described, it will be apparent to those skilled in the art that various changes and modifications may be made without departing from the spirit of the invention or from the scope of the appended claims.

The invention claimed is:

1. In a joint seal for the several portions of metallically encased rectifying devices, a metallic member extending into said casing, a plurality of rings formed of insulating material secured to and supported by said metallic member, metallic rings binding the edges of the first said rings, and a cap member attached to the casing and contacting with said metallic rings to form a gas-tight seal.

2. In a joint seal for the several portions of metallic vapor electric current rectifiers, a metallic member extending into said casing, a ring of insulating material secured to and supported by said metallic member, a metallic ring binding the edge of the first said ring, a cap member attached to said rectifier and having complementary inner surfaces forming seats contacting with said metallic ring, and means for maintaining said metallic ring in gas-tight relation with said cap member.

3. In a joint seal for the several portions of metallic vapor electric current rectifiers, a metallic member extending into said casings, a ring of insulating material secured to and supported by said metallic member, a metallic ring binding the edge of the first said ring, a cap member attached to said rectifier and having complementary inner surfaces forming seats cooperating with said metallic ring, means for maintaining said metallic ring in gas-tight relation with said cap member, and means for testing the sealing action of said rings and the seats formed on the said cap member by application of a fluid sealing means thereto.

4. In a joint seal for the several portions of metallically encased rectifiers, a metallic member extending into said rectifier, a plurality of disks extending from said metallic member, insulation arranged in the spaces between said disks, a ring enclosing the edges of said insulation, a cap member having seats formed therein for said ring, an insulator resting upon said cap member, and means connecting said insulator and said metallic member for maintaining said ring in gas-tight relation with said cap member.

5. In a joint seal construction for evacuated metallic casing rectifiers, a metallic member extending into the casing, said member having a plurality of spaced parallel disks formed therewith and extending laterally therefrom, reinforced insulation arranged to fill the spaces between the disks, a ring substantially enclosing said insulation, a cap member attached to the casing and substantially enclosing said metallic member, said cap member having a seat formed thereon for said ring, and a spring resiliently connecting said metallic member and said cap member to secure gas-tight seating of said ring on the seats therefor.

In testimony whereof I have hereunto subscribed my name this 23d day of April, A. D. 1930.

OTHMAR K. MARTI.